United States Patent [19]

Quirk et al.

[11] 3,956,577
[45] May 11, 1976

[54] REINFORCED SEAL STRUCTURE FOR AN ELECTRICAL PENETRATION

[75] Inventors: James F. Quirk, Pittsburgh, Pa.; David Green, Corning, N.Y.

[73] Assignee: Westinghouse Electric Corporation, Pittsburgh, Pa.

[22] Filed: Sept. 25, 1974

[21] Appl. No.: 509,179

[52] U.S. Cl. .............................. 174/151; 174/11 R
[51] Int. Cl.² ................. G21C 13/02; H01B 17/26
[58] Field of Search ............ 174/11 R, 18, 142, 143, 174/151, 152 R, 153 R; 176/87

[56] References Cited
UNITED STATES PATENTS

| 3,775,547 | 11/1973 | Woods | 174/152 R |
| 3,781,453 | 12/1973 | Funk et al. | 174/151 X |
| 3,882,262 | 5/1975 | Korner et al. | 174/151 X |

Primary Examiner—Laramie E. Askin
Attorney, Agent, or Firm—W. G. Sutcliff

[57] ABSTRACT

An improved seal structure for an electrical penetration in which at least one conductor is sealed within a tubular metal enclosure member by a compressive setting resinous potting material. A seal shroud extends from the interior surface of the metal enclosure member and acts as the seal surface against which the resin forms a compressive seal, as well as against the conductor member. An annular foraminous reinforcing member extends from the free end of the seal shroud to provide an increased strength seal.

3 Claims, 3 Drawing Figures

REINFORCED SEAL STRUCTURE FOR AN ELECTRICAL PENETRATION

BACKGROUND OF THE INVENTION

The present invention relates to electrical penetrations which are utilized in sealing electrical conductors through a nuclear containment.

In nuclear power plants, a variety of electrical conductors must be sealingly brought through a containment wall which isolates the plant from the environment. The assembly for bringing the electrical conductors through the containment is termed a nuclear penetration. The penetration must be able to withstand high temperature and pressure, as well as high radioactivity levels. The seal assembly of the penetration must be able to withstand thermal cycling and heat aging in order to be acceptable for use in nuclear power plants.

A nuclear penetration design is set forth in copending application Ser. No. 432,375, filed Jan. 10, 1974, now U.S. Pat. No. 3,882,262 owned by the assignee of the present invention. This earlier penetration utilizes a generally tubular metal enclosure member which is adapted to be passed through a sealing flange which is sealingly mounted into a nozzle which extends through the containment. The electrical conductor is insulatingly passed through the tubular metal enclosure member, and an epoxy resin sealing material substantially fills the enclosure member to form a seal along and about the electrical conductor passing therethrough. A metallic seal shroud extends from the interior surface of the enclosure member, with the terminating end of the seal shroud spaced from the enclosure member. The epoxy resin sealing material fills the enclosure member and upon compressive setting forms a seal along and about the exterior surface of the seal shroud.

It is desired to increase the reliability of this seal design and to improve its thermal cycling characteristic.

It has been discovered that over an extended period with frequent extreme high temperature variations, the seal formed at the seal shroud may be damaged due to cracking of the cured epoxy resin. Under these extreme conditions the epoxy resin has cracked along a path extending from the free terminating end of the seal shroud outward through the cast epoxy body. When the seal structure is thermally cycled, a significant shear force is concentrated at the terminating end of the seal shroud. This end portion defines a boundary between the solid epoxy portion and the portion which is in compressive sealing engagement with the exterior surface of the seal shroud.

Various attempts to strengthen the seal structure with a modified epoxy composition or with varying filler and diluent amounts, did not significantly improve the thermal cycling characteristics of the seal structure.

SUMMARY OF THE INVENTION

An improved electrical penetration assembly is detailed, of the type comprising a metal enclosure member filled with an epoxy resin sealing material and an electrical conductor passing through the enclosure member. A metallic annular seal shroud extends from the interior surface of the metal enclosure member and is sealed thereto, and includes a relatively rigid free end which is symmetrically spaced about the conductor which passes through the seal shroud. A compressive setting epoxy resin potting material substantially fills the enclosure member, and provides an in situ formed compression seal along and about the conductor, and along and about the free end of the annular seal shroud. The seal area at the seal shroud end is improved in strength by providing an annular foraminous, relatively yieldable, shear grading member extending from the free end of the seal shroud. The compressive setting epoxy resin material flows through and encompasses the shear grading member

DESCRIPTION OF THE PREFERRED EMBODIMENTS

Figure 1:
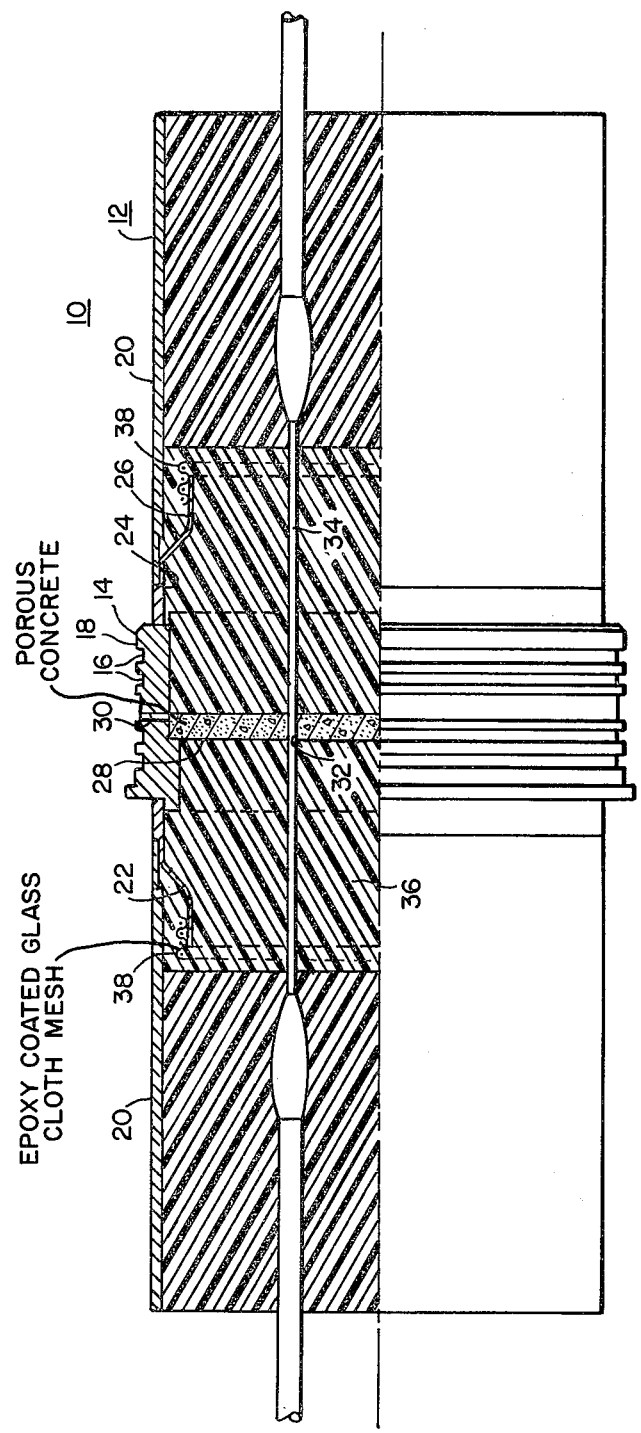
FIG. 1 is an elevational view partly in section of a penetration assembly of the present invention.

In the exemplary embodiments seen in FIG. 1, the penetration assembly 10 comprises a generally tubular enclosure member, metallic enclosure member 12. The enclosure member 12 in turn is formed of a centralized header portion 14, which has a plurality of circumferentially disposed O-ring sealing grooves 16 in the exterior surface 18 thereof. Elongated tubular extensions 20 extend from each end of the central header 14 and are sealed to the central header. The enclosure member 12 may also be formed as a unitary generally tubular member. A seal shroud means 22 sealingly extends from the interior surface 24 of the enclosure member 12. The seal shroud means 22 includes a generally tubular extending end portion 26 which is spaced from the interior surface 24. Enclosure member 12 is generally concentrically disposed therein. The seal shroud means 22 extends from either side of the central header portion 14 to provide an inboard and outboard seal. A centrally disposed porous concrete leak monitoring chamber 28 is disposed within the penetration assembly, and more particularly centrally disposed within the central header portion 14. An aperture 30 is provided through the header portion 14 to permit connection to a leak detection system. The leak monitoring means 28 has an aperture 32 therethrough through which the electrical conductor 34 passes, with the electrical conductor 34 longitudinally extending through the enclosure member. While a single electrical conductor is shown herein, a plurality of electrical conductors of varying sizes may be passed through the penetration assembly.

An epoxy resin potting material 36 substantially fills the central portion of the enclosed member, on either side of the centrally located porous concrete leak monitoring chamber 28. The epoxy resin material 36 forms an in situ compressive seal about and along the conductor 34, and about the seal shroud means 22. An annular foraminous, relatively yieldable, shear grading member 38 extends from the tubular end portion 26 of seal shroud means 22. The member 38 is preferably a mesh of glass cloth fiber which is coated with a partially cured epoxy resin, which is in turn fully curable when embedded in with the epoxy resin 36, which during curing generates heat in an exothermic reaction which typically produces a temperature of 100°–150°C within the resin casting. The epoxy coated glass cloth mesh may be wrapped about the extending end of the tubular portion of the seal shroud and typically extends about a half inch beyond it. A mesh which has been found to be useful in the present invention is a trademarked material "ELSAN 314" epoxy preimpregnated glass cloth supplied by the Eli Sandman Company of Worchester, Massachusetts. The epoxy coated glass cloth mesh is a style 750 leno with a thread count of 7.5 by 7.5, a thickness of about 10 thousandths of an inch, and a weight per square yard of about 4.1 ounces.

In one embodiment of the present invention, the spacing between the interior surface of the enclosure member 12 and the tubular end portion 26 of seal shroud 22 is about 0.25 inch, and it has been found desirable to wrap two passes of the mesh about the tubular end portion of the seal shroud extending beyond the terminating end. The mesh 38 may be initially adhered to the seal shroud by means of any conventional type of cement or epoxy resins.

Epoxy resin 36 is then cast in the volume defined by the enclosure member 12, including the volume between the seal shroud 22 and the enclosure member. The epoxy resin upon curing forms a compressive seal along and about the conductor 34, and along and about the exterior surface of the tubular portion 26 of the seal shroud. In testing the improved seal structure of the present invention compared to the prior art seal shroud structure, the test assemblies were repeatedly cycled at temperatures ranging from 160° to 200°C back to room temperature for extended periods of time. A crack or fracture failure resistance rating was derived from evaluating the strength of the test samples. For the prior art device, a crack resistance rating of about 2.5 was achieved. The glass cloth mesh reinforced embodiment of the present invention produced a crack resistance rating greater than about 8. The rating system establishes a higher crack resistance rating value for increasing resistance to cracking during thermal cycling. A variety of other attempts to strengthen or improve the crack resistance had met without success. The change in the epoxy resin formulation to substantially eliminate diluent produced a much lower crack resistance rating. Reduction of the filler weight percentage also substantially reduced the crack resistance rating, as did modification of the filler constituent from silica to beryllium oxide. An increased filler weight percentage in the epoxy resin did produce some slight increase in crack resistance rating, as did an increase in the diluent produced by the addition of epoxidized linseed oil to the preferred epoxy resin mixture. The prior art penetration typically fractures along a line extending from the extending end of the tubular seal shroud portion at an angle of about 30° to 45° from the normal line between the seal shroud and the enclosure member. The glass cloth shear grading member reinforces this high stress area and increases the initial tensile strength and shear strength of the epoxy resin structure. Provision of the partially cured resin coating along the glass fiber mesh provides a homogeneous interface between the finally cast epoxy resin and the fiberglass of the fiber mesh. The partially cured epoxy portion of the coated glass fiber mesh comprises about 25% by weight of the mesh.

Figure 2:
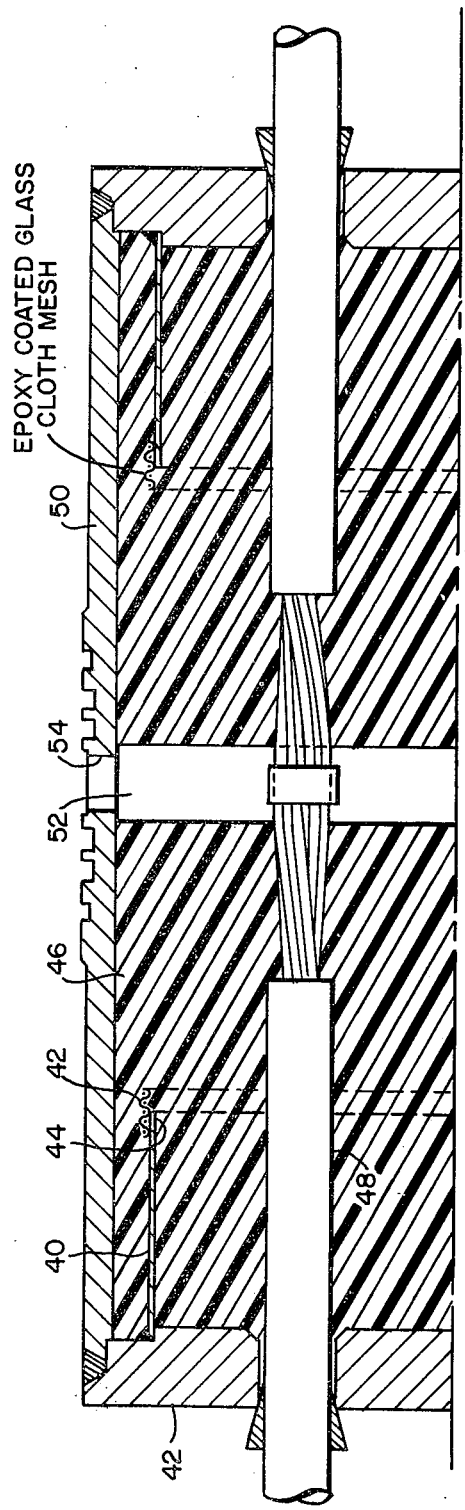
FIG. 2 is an alternative embodiment of a half section of a penetration assembly.
Figure 3:
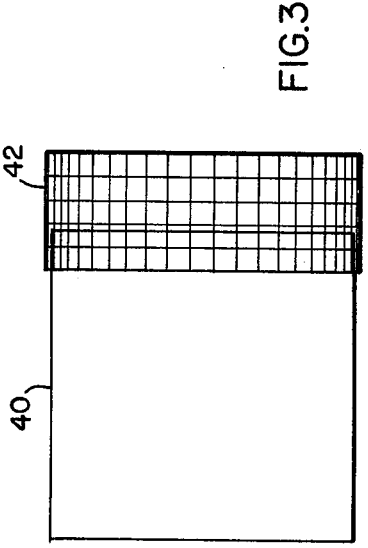
FIG. 3 is a side elevational view of sub-assembly showing the generally tubular seal shroud means with the foraminous grading member affixed thereto prior to assembly into the penetration assembly.

In another embodiment seen in FIG. 2 and FIG. 3, an annular tubular seal shroud means 40 is seen extending from end headers 42 to which the seal shroud is welded forming a seal. The epoxy coated glass fiber mesh shear grading member 42 again is wound about the terminating end portion 44 and extends some distance therefrom generally in a tubular fashion. The epoxy resin 46 upon compressive sealing forms a seal along the length and about the central conductor 48 and also along and about the exterior surface of the tubular seal shroud 40.

The epoxy resin material 46 fills the volume defined by the tubular enclosure member 50 to which the end headers 42 are weld sealed. A central leak monitoring chamber 52 is provided within the assembly, and aperture 54 through the enclosure member 50 communicates with the leak chamber 52.

The epoxy resin material which fills the enclosure member is a material which upon curing forms a compressive seal on the conductor and the seal shroud. The preferred epoxy material is 100 parts by weight "Epon Resin 815," 20 parts "Curing Agent Z," both of which are trademarked materials of the Shell Oil Company, and 280 parts by weight ground silica filler. Other comparable, insulating, temperature and pressure resistant materials, which form a compressive seal can be used.

What we claim is:

1. An electrical penetration assembly comprising a metal enclosure member, at least one metal annular seal shroud extending from and sealed to the interior surface of the metal enclosure member, which metal annular seal shroud includes a relatively rigid free end which is symmetrically spaced about the longitudinal axis of the metal enclosure member, at least one electrical conductor passing through the metal enclosure member at or parallel to the longitudinal axis of the metal enclosure member and passing through and spaced from the annular seal shroud, a compressive setting, resinous potting material substantially filling the enclosure member and providing an in situ formed compression seal along and about the conductor and along and about the free end of the annular seal shroud, the improvement wherein an annular foraminous relatively yieldable shear grading member extends from the free end of the seal shroud.

2. The assembly specified in claim 1, wherein the shear grading member is a glass fiber mesh coated with a partially cured resinous coating which is fully cured as the resinous potting material cures.

3. The assembly specified in claim 1, wherein the metal enclosure member comprises an elongated tubular member and the annular seal shroud sealingly extends from the interior surface of the tubular enclosure member, which annular seal shroud includes a tubular end portion which is disposed concentrically within and spaced from the tubular enclosure member, and wherein the shear grading member extends from the tubular end portion of the seal shroud, with the compressive setting resinous potting material forming a compressive seal along and on the exterior surface of the tubular end portion.

* * * * *